W. L. POTTER.
Belt-Fastener.

No. 226,546.   Patented April 13, 1880.

Witnesses:
R. F. Gaylord
M. F. Dooley

Inventor:
W. L. Potter
By W. E. Simonds
Atty.

UNITED STATES PATENT OFFICE.

WILSON L. POTTER, OF HARTFORD, CONNECTICUT.

BELT-FASTENER.

SPECIFICATION forming part of Letters Patent No. 226,546, dated April 13, 1880.

Application filed February 24, 1880.

*To all whom it may concern:*

Be it known that I, WILSON L. POTTER, of the city of Hartford, in the county of Hartford and State of Connecticut, have invented a certain new and useful Improvement in Belt-Fasteners for Driving-Belts, whereof the following is a description, reference being had to the accompanying drawings, where—

Figure 1:
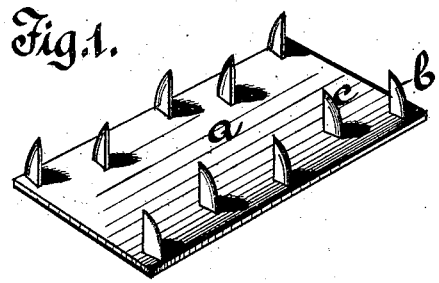
Figure 2:
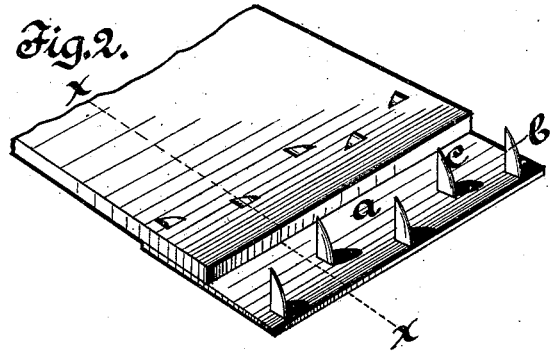
Figure 3:

Figure 1 is a view of a belt-fastener embodying my improvement. Fig. 2 is a view of the same fastener with one end of a driving-belt attached thereto. Fig. 3 is a view of the parts shown in Fig. 2, in section on the plane $x$ $x$, enlarged.

The letter $a$ denotes a metallic plate, commonly of brass or wrought or malleable iron, bearing along each of two opposite edges a row of teeth, $b$ $b$, &c., and also, set farther inward upon the plate, another row of teeth, $c$ $c$, &c.

The location of the teeth $c$ is alternate (lengthwise of the plate) to the location of the teeth $b$, and for that reason I speak of the two different rows of teeth hereinafter as alternately located.

When I speak of the "width" of the plate herein I mean thereby that direction across the plate in which the tractive action of the belt is exerted upon the plate in use, and the direction across the plate at right angles to such width is spoken of herein as the "length" of the plate. These definitions are essential, for the reason that in some small sizes of the fastener the plate, unlike that shown in the drawings, is longest in the direction in which the belt exerts its tractive action.

The breadth of the teeth $b$ and $c$ is greater than their thickness, and the teeth are so set upon the plate that their breadths lie in the direction of the width of the plate. This causes the teeth to cut or sever but a small portion of the breadth of the belt, and by reason thereof they do not substantially impair the strength of the belt. The alternate location of the teeth in the two rows helps to the same end. These teeth are curved and edged in front, (meaning by "front" that edge which is nearest the edge of the plate $a$,) the more readily to enter and pierce the belt, and they are flat on the back to afford a good bearing on the leather, particularly where the tooth is bent down upon and forced into the leather, as illustrated in Fig. 3.

The teeth are long enough to pass entirely through the belt and have the ends clinched back upon the belt, as shown in Figs. 2 and 3.

I claim as my invention—

A belt-fastener composed of the single plate $a$, bearing near two opposite edges teeth curved and edged in front and flat on the back, with their breadths lying in the direction of the width of the plate, and their tips made malleable for bending down upon the belt, all substantially as shown and described.

WILSON L. POTTER.

Witnesses:
ROBT. F. GAYLORD,
WM. E. SIMONDS.